C. BEILE.
MOTOR OPERATED SIGN APPARATUS.
APPLICATION FILED DEC. 7, 1907.

924,416.

Patented June 8, 1909.
6 SHEETS—SHEET 1.

C. BEILE.
MOTOR OPERATED SIGN APPARATUS.
APPLICATION FILED DEC. 7, 1907.

924,416.

Patented June 8, 1909.
6 SHEETS—SHEET 3.

Witnesses:

Inventor
Charles Beile
By his Attorneys

C. BEILE.
MOTOR OPERATED SIGN APPARATUS.
APPLICATION FILED DEC. 7, 1907.

924,416.

Patented June 8, 1909.
6 SHEETS—SHEET 4.

C. BEILE.
MOTOR OPERATED SIGN APPARATUS.
APPLICATION FILED DEC. 7, 1907.

924,416.

Patented June 8, 1909.
6 SHEETS—SHEET 5.

UNITED STATES PATENT OFFICE.

CHARLES BEILE, OF NEW YORK, N. Y.

MOTOR-OPERATED SIGN APPARATUS.

No. 924,416.  Specification of Letters Patent.  Patented June 8, 1909.

Application filed December 7, 1907. Serial No. 405,570.

*To all whom it may concern:*

Be it known that I, CHARLES BEILE, a citizen of the United States, residing in New York, borough of Brooklyn, county of Kings, and State of New York, have invented certain new and useful Improvements in Motor-Operated Sign Apparatus, of which the following is a specification.

This invention relates to sign apparatus, and more particularly to apparatus of this kind in which a number of advertising signs are successively unrolled, by means of motor-operated take-up mechanism, from a number of spring-rollers, so that each sign is exhibited for a certain length of time.

One object of the invention is to provide improved means for mounting the spring-rollers and taking up the signs, and improved mechanism for moving the unrolled signs from the front to the rear of the apparatus and then permitting them to be rewound on their rollers.

A further object of the invention is to furnish a construction in which the signs are displayed by an intermittently acting take-up mechanism, the motor which operates said mechanism being stopped automatically by the take-up mechanism when each sign is unrolled and displayed and then restarted after a certain period of time.

With these and other ends in view, which will appear as the invention is better understood, the same consists in the novel features and combinations of parts to be hereinafter described and claimed.

In the accompanying drawings,
Fig. 4, Figs. 7 and 8 are details of portions of Figs. 5 and 6 respectively, showing the parts in different positions.

Similar letters of reference indicate corresponding parts throughout the different figures of the drawings.

Referring to the drawings, C represents the casing of my improved sign-apparatus, which is preferably provided at the upper part with a clock $C^1$, the dial of which is provided with a switch-device $d$ that is closed at every minute or other intervals of time by the second-hand or minute-hand of the clock. In the circuit of the switch $d$ is placed a starting and stopping device D for an electric motor M, said starting and stopping device and the motor being arranged at the lower part of the casing C. The motor M is connected by means of a switch, that is closed or opened by the starting and stopping device D, with a supply of electric current obtained either from a primary or secondary battery or from an electric light station.

Figure 1:
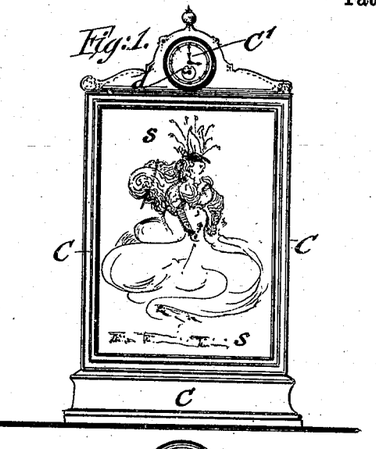
Figure 1 represents a front-elevation of my improved sign-apparatus.
Figure 2:
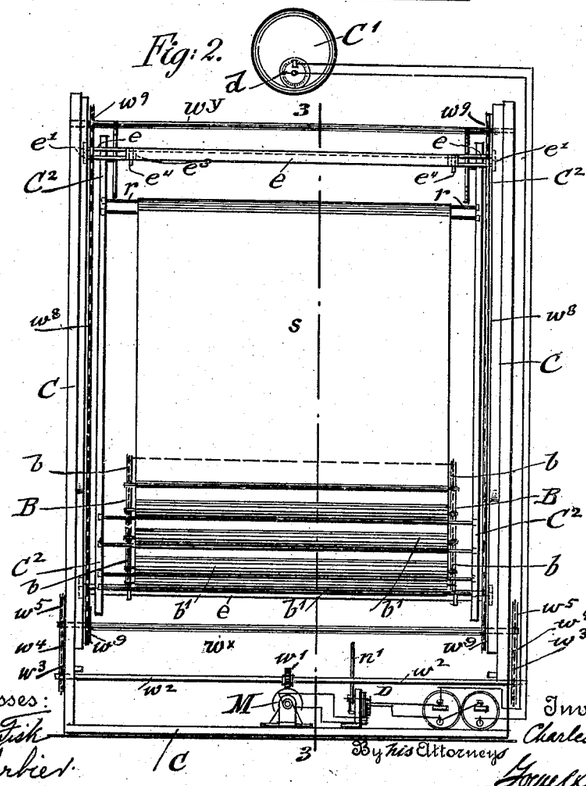
Fig. 2 is also a front-elevation of the sign-apparatus with the front-part removed, and showing the relative location of the different actuating mechanisms for the signs, Fig. 2ª is an enlarged front-elevation of the apparatus, Fig. 2ᵇ shows in detail certain portions of Fig. 2ª.
Figure 2A:
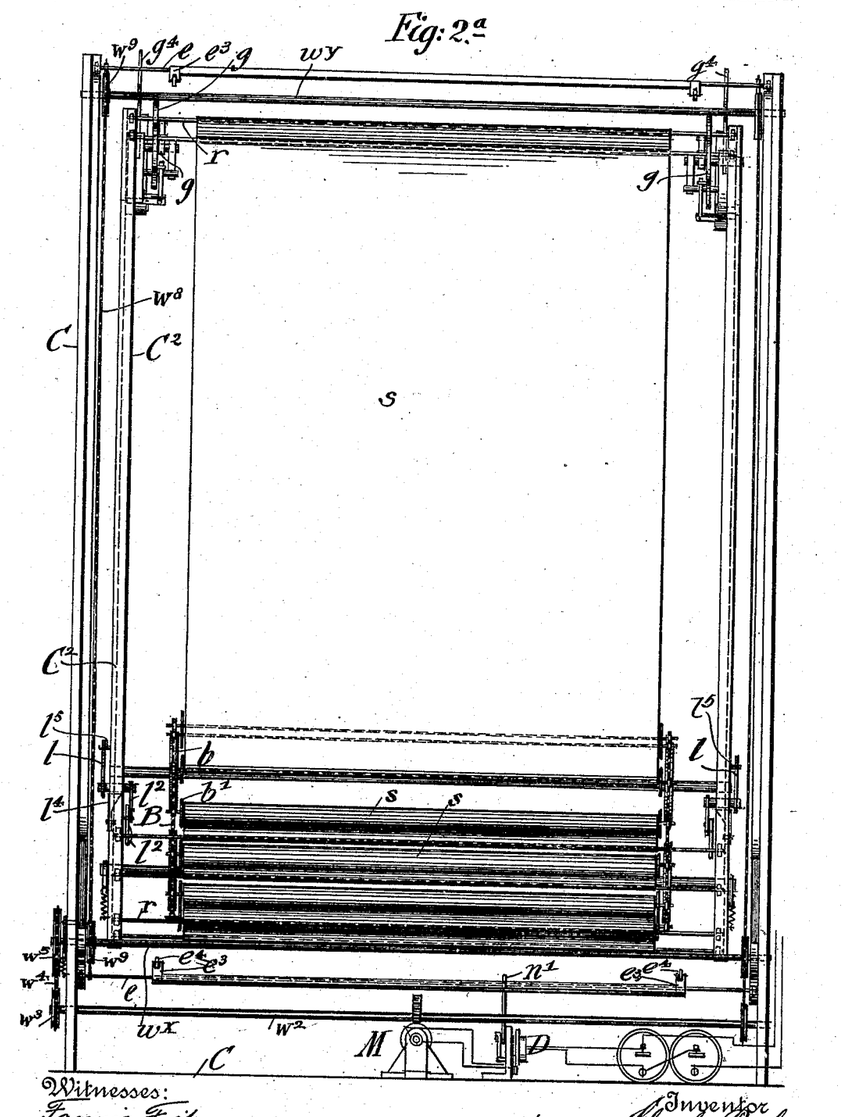
Figure 2B:
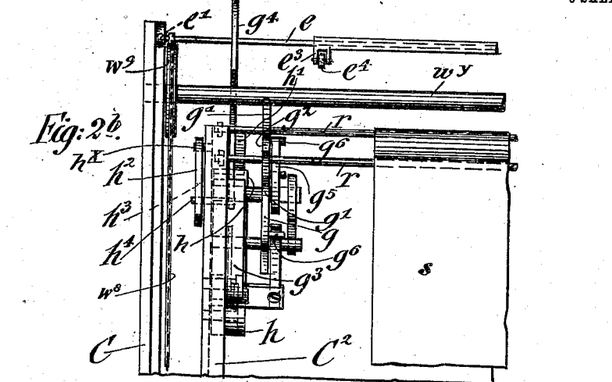
Figure 3:
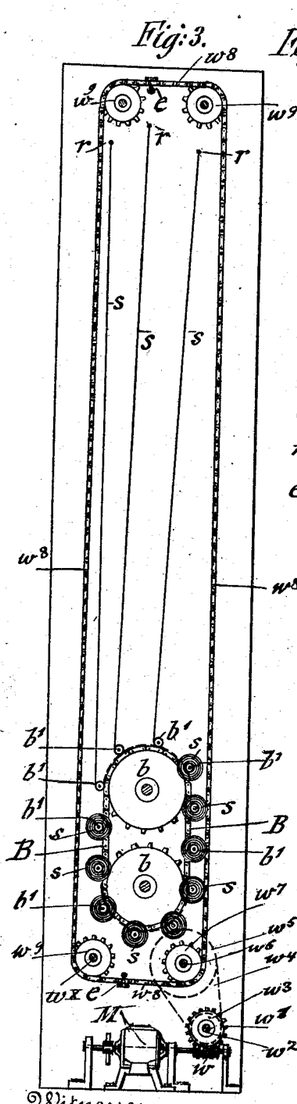
Fig. 3 is a vertical transverse section on line 3, 3, Fig. 2, showing the carrier-belt for the spring-rollers and the driving mechanism for the same, drawn on a larger scale.

On the armature-shaft of the electric motor M is placed a worm $w$ which meshes with a worm-gear $w^1$. The shaft $w^2$ of the worm-gear $w^1$ is supported in bearings of the casing C and provided at each end with a sprocket-wheel $w^3$, which sprocket-wheels transmit motion by means of sprocket-chains $w^4$ to sprocket-wheels $w^5$. On the shaft $w^6$ of the sprocket-wheels $w^5$ are mounted two driving sprocket-wheels $w^7$ which mesh with two endless driving sprocket-chains $w^8$ that extend throughout the height of the casing and that are guided each by three additional guide sprocket-wheels $w^9$, of which one is located sidewise of the driving sprocket-wheel at the lower part of the casing and the remaining two at the upper part of the casing, as shown in Figs. 2ª and 3, so that the driving-chains $w^8$ assume an oblong shape of which the longer runs are located respectively near the front and rear of the casing C and the shorter runs at the lower and upper portions of the same. The shaft $w^x$ of the lower guide sprocket-wheel $w^9$ of the endless driving-chains $w^8$ is supported in pivoted and spring-actuated bearings $w^{10}$, shown at the lower left-hand portion of Fig. 4, by which a proper degree of tension is imparted to the driving sprocket - chains. The sprocket-wheels $w^9$ at the top of the casing are mounted on shafts $w^y$ extending between and journaled in the side walls C.

Adjacent to the driving sprocket-chains $w^8$ are arranged parallel with the side-walls of the casing C upright partitions $C^2$. On these partitions are supported the shafts of two pairs of larger sprocket-wheels $b$, $b$ of equal size, which are located adjacent to the driving-chains $w^8$ at the lower part of the casing C. On the sprocket-wheels $b$ are placed two endless carrier-chains B on which are mounted equidistantly from each other a number of spring-rollers $b^1$, of which twelve are shown in the drawings, though a larger or smaller number of spring-rollers may be used, according to the number of advertising signs $s$ that are to be arranged in the sign-apparatus. The spring-rollers $b^1$ are removably held in their sockets on the carrier-chains by means of set-screws $b^x$.

To opposite points of the driving-chains $w^8$ are attached transverse take-up rods $e$ which are provided at their ends with anti-friction-rollers $e^1$, said rollers passing into guideways $e^2$ of the side-walls of the casing C and being guided in the same. The guideways $e^2$ for the take-up rods extend from the lower end to the upper end of the casing and are made approximately semicircular at the lower end, and straight at the sides. At their lower parts the guideways are left open at certain points, as shown, and they are also left open at the upper part of the casing where the stretching rods are delivered to the return mechanism, which will be hereinafter described. On each take-up rod $e$ are mounted inwardly extending arms $e^3$ carrying antifriction rollers $e^4$, which serve to engage stretching rods $r$ that are attached to the outer ends of the advertising signs. The ends of the stretching rods $r$ are guided by rollers $r^1$ in guideways $r^2$ located on the partitions $C^2$, said guideways extending along the sides and lower portions of the partitions but not at the upper portions. When the take-up rollers $e^4$ are moved in upward direction, they serve to take up one of the stretching rods $r$ which is then at the front-part of the casing C and which is moved into the path of the take-up rollers $e^4$ by a throwing-in mechanism, shown in Fig. 4. The throwing-in mechanism consists of levers $l$ that are pivoted to the partitions $C^2$ and extended rearwardly adjacent the guideways $r^2$ of the stretching rods $r$, while to the inner ends of the levers forwardly-extending arms $l^1$ are applied which are made of two pivotally-connected parts $l^2$ that are locked together by pins $l^3$ on one part, which enter recesses on the other part, so as to form straight connected lever-arms when lifted in upward direction, but form an angle with each other for permitting the dropping back into normal position. The lower part $l^2$ is weighted for returning the levers $l$ into their former position against stop-pins $l^5$ on the outer sides of the partitions $C^2$.

Figure 4:
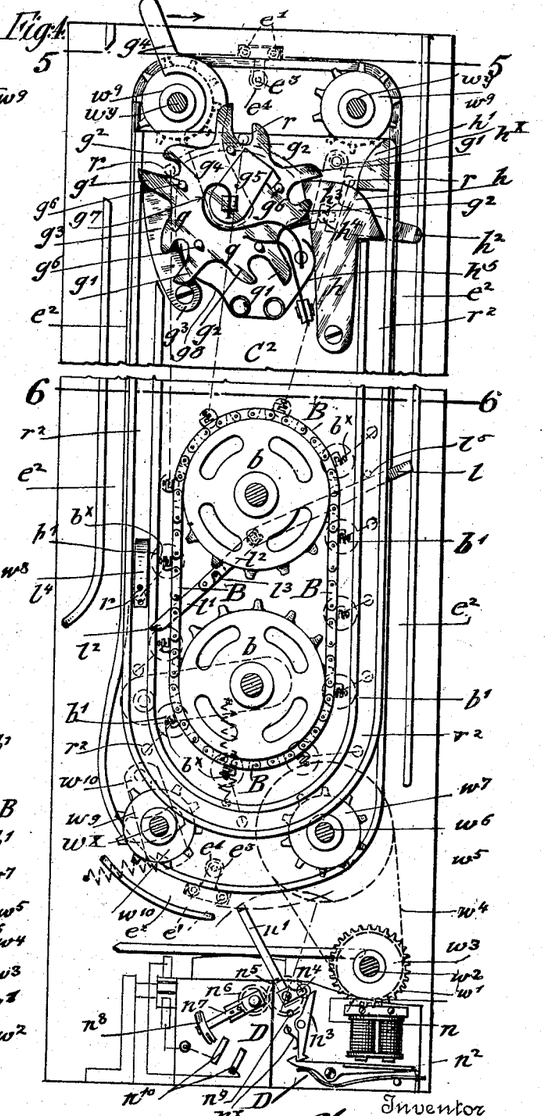
Fig. 4 is a side-elevation of the carrier-chain and the actuating mechanism and the return mechanism for the advertising signs, Fig. 4ª is a detail view of one of the take-up devices.

At each semi-rotation of the endless driving-chains, one pair of take-up rollers $e^4$ descends at the rear of the casing, while the other pair of take-up rollers $e^4$ ascends at the front-part of the same. During the downward motion of the take-up rollers $e^4$, the levers $l$ are lowered until the rollers have cleared the same, and the jointed arms $l^1$ are raised, so that the stretching rod $r$ which is then nearest to and in the path of the arms $l^1$ is engaged by the upward motion of the arms, lifted and placed on the upper bent or shouldered ends of flat springs $l^4$ which are attached at their lower ends to the partitions $C^2$ in the ways $r^2$, as shown in Fig. 4, after which the jointed arms drop back into the lower position, clear of the stretching rod. The take-up rollers $e^4$ are then guided in their ways by the motion of the driving-chains so as to project into the path of the stretching rod $r$ and take it along in upward direction to the upper ends of the guideways, drawing thereby the advertising sign $s$ against the tension of its spring-roller out to its full length and holding it at the front of the casing for the required length of time for exhibiting it, until by the next motion imparted to the driving-chains, the next stretching rod is taken up by the take-up roller, its advertising sign $s$ drawn out to its full length and over the sign which preceded it and whose stretching rod is then taken up by the return-mechanism at the upper end of the casing. The signs that are drawn out for exhibition are moved backward and downward by the return mechanism and held in stretched condition by the spring-rollers with which they are connected, the latter following the motion of the driving-chains by the drag exerted by them on the carrier-belts, which latter have no positive motion of their own but follow intermittently the motion of the driving-chains around their guide sprocket-wheels. The take-up rollers $e^4$ have free lateral play as long as the rollers $e^1$ move in the open portions of the guideways $e^2$ so as to clear the stretching rods $r$, but as soon as the take-up rods enter into the closed portions they are engaged by the guide-ways and move rigidly in the same so as to engage and carry along the stretching rod which is then placed in their path as described.

The return-mechanism for the stretching rods of the advertising signs is located at the upper ends of the partitions $C^2$, one return device being arranged on each partition for taking up the stretching rods and returning them with the signs to their former normal position on the spring-rollers of the carrier-belts. Each return-device consists of a disk or wheel $g$, which is provided with pairs of longer and shorter teeth $g^1$, $g^2$, in the nature of a ratchet-wheel, and recesses or pockets between said teeth, the longer teeth projecting into the path of the upwardly moving stretching rods $r$, carried along by the take-up rollers $e^4$.

Figures 4A, 8:
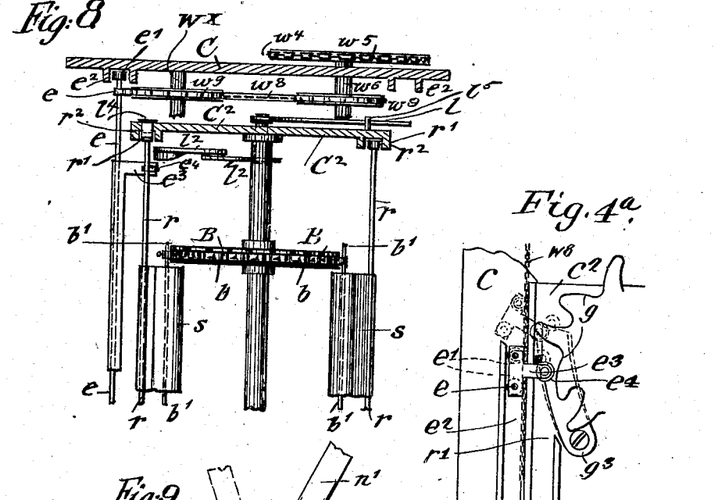
Figure 5:
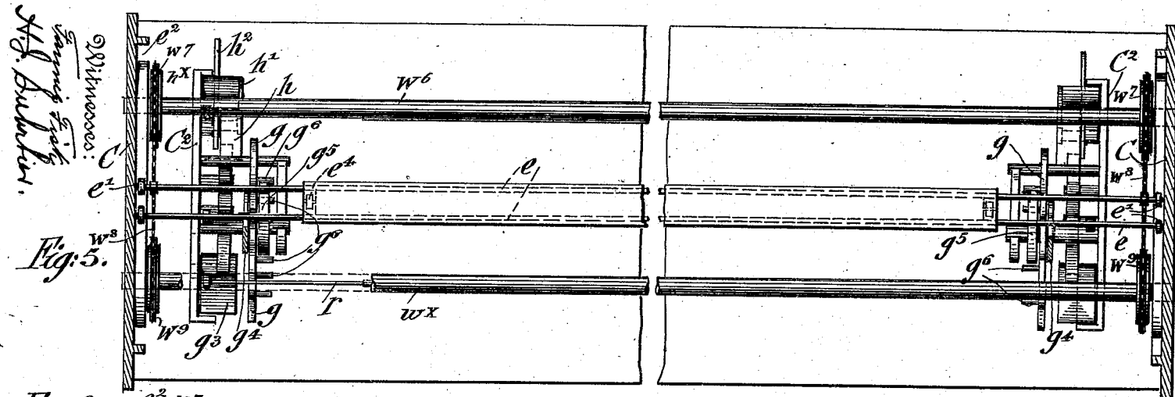
Figs. 5 and 6 are horizontal sections on lines 5, 5, and 6, 6.
Figure 6:
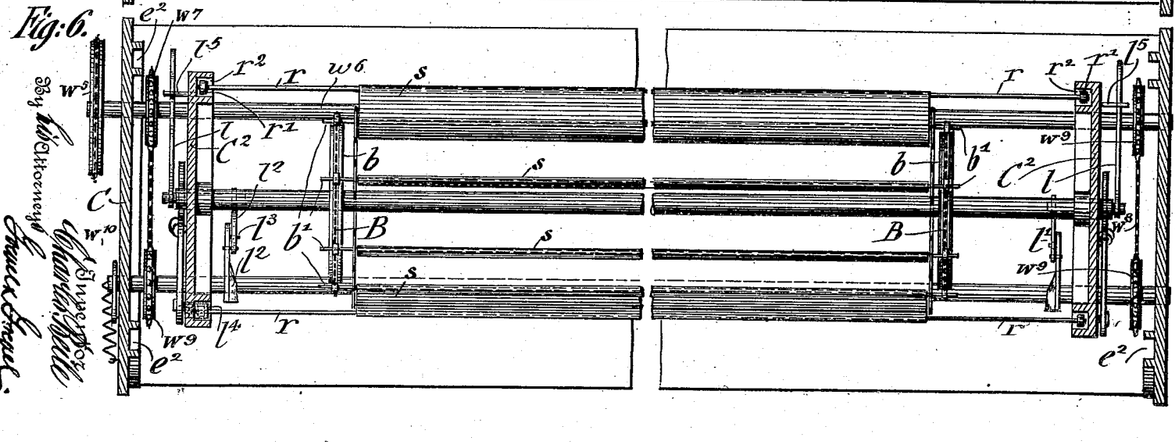
Figure 7:
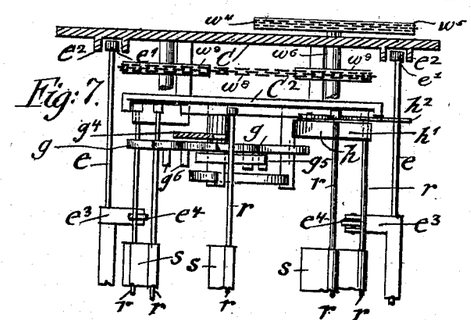

Alongside of the wheel $g$ is arranged in the guideway $r^2$ a pivoted latch $g^3$ acted on by a spring $g^8$ having a curved edge along which the stretching rod $r$ is moved so as to press it inwardly. At the same time the latches $g^3$ are moved inwardly by the stretching rod the latter is released by the take-up rod which simultaneously arrives at the open portion of its guideways $e^2$, so that it swings away by gravity from the stretching rod, which is then deposited upon the upper edges of the latches $g^3$. The swinging away of the take-up rod from the stretching rod by gravity is produced by the pivoting of the take-up rod to each driving chain, as shown in Fig. 4$^a$, the take-up rod consisting in reality of two parallel rods which carry the take-up devices $e^3$, $e^4$, one of these parallel rods being so connected to the chains as to permit the swinging out of the whole device, under the weight of the stretching rod, when the upper open part of the guideways $e^2$ is reached. From the latches $g^3$ the stretching rod is taken by the adjacent upwardly-moving longer teeth $g^1$, whereupon it drops into the pockets of the wheels $g$ above said teeth. The motion of each take-up roller $e^4$ continues in upward direction around the upper guide-sprockets until the take-up rod $e$ abuts against a spring-actuated push-lever $g^4$ and carries the same along in the direction of the arrow shown in the upper part of Fig. 4, so that a pusher-arm $g^5$ on the push-lever $g^4$ abuts against a stop-pin $g^6$ on the ratchet-wheel $g$ and turns the ratchet-wheel on its axis, carrying thereby the stretching rod delivered to one of the pockets of the ratchet-wheel along from its position at the front-part of the casing to an intermediate position in the same. The ways for the stretching rods terminate sidewise of the return-mechanism and permit the carrying over of the stretching rods toward the rear of the casing. By the next motion of the ratchet-wheel $g$, due to the next stretching rod being delivered into the next pocket of the ratchet-wheel, the stretching rod which was carried over into the intermediate position, is then moved over the upper curved edge of a second pivoted and spring-actuated latch-lever $h$ against the curved edge of a stationary stop-plate $h^1$ which is located at the upper end of the rear guideway $r^2$ by which the stretching rod is arrested and retained in the angle formed by the latch-lever $h$ and stop-plate $h^1$. In the meantime the take-up roller $e^4$ has passed over the upper guide sprocket-wheels and commenced its descending motion. The take-up rod $e$ then engages the backwardly extending arm of an elbow lever $h^2$, which is pivoted at $h^x$ by its upwardly extending arm to the partition $C^2$ and which engages by a recess $h^3$ in its angular portion a pin $h^4$ on the latch-lever $h$ so as to move the latter in forward direction in an arc of a circle, of which its pivot is the center, so that the stretching rod $r$, which was before supported in the angle between the upper edge of the latch-lever and the stop-plate, is permitted to drop in downward direction into the guideway $r^2$. The pivoted latch-lever $h$ is then returned by its spring $h^5$, together with the elbow-lever $h^2$, into its former position as soon as the pressure of the take-up rod $e$ on the arm of the elbow-lever is released. In the same manner the push-lever $g^4$ is also returned to normal position by its spring $g^7$, as shown clearly in Fig. 4, ready for the next action by the take-up rod, so that the latch $g^2$, the push-lever $g^4$, the latch-lever $h$ and its actuating elbow-lever $h^2$ assume their former positions ready for the return of the next stretching rod, and so on. When the take-up rod moves downwardly at the rear of the casing after having passed the elbow-lever $h^2$, it serves to support the stretching rod of the advertising sign at the rear of the casing, said sign being gradually wound up when the take-up rod continues its downward movement. Simultaneously with the return motion imparted to the stretching rods by the return-mechanism described, the spring-rollers to which the signs are applied are moved with their carrier-belts around their guide-sprockets, and during this motion the spring-rollers begin to wind up the signs and the more so, the closer the stretching rods are gradually moved toward the spring-rollers, they being entirely wound up when the stretching rods are located adjacent to and close to the spring-rollers, as shown at the lower part of Fig. 4. The endless carrier-chains receive their motion intermittently by the action of the take-up rollers on the individual stretching rods of the advertising signs. Every time the take-up rollers engage a stretching rod and move the same in upward direction a pull is exerted on the corresponding spring-roller and the carrier-chains are compelled to follow the motion of the same around the guide-sprockets.

The starting and stopping device D for the motor M is arranged at the lower part of the casing near one corner of the same, and consists of an electromagnet $n$ which is placed in the circuit of a local battery and connected with the contact-points of the switch $d$ on the clock-dial. Below the electromagnet is arranged a fulcrumed and spring-actuated armature $n^2$ which is attracted when the switch is closed at the interval of a minute, or at any other interval of time by the second- or minute-hand of the clock. A projection on the end of the armature-lever $n^2$ serves to engage a fulcrumed and spring-actuated latch-lever $n^3$ and holds it in position against an anti-friction-roller on the lower end of a fulcrumed elbow-lever $n^4$ acted on by a spring $n^y$ so as to hold said lever in the position shown in full lines in Fig. 4 and in dotted lines in Fig. 9.

Figure 9:
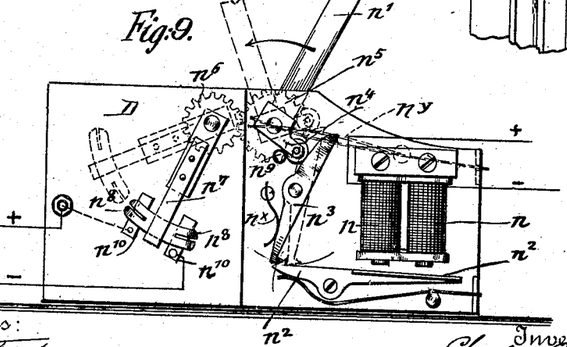
Fig. 9 is a detail side-elevation showing the starting and stopping mechanism for the sign-operating motor, drawn on a larger scale.

On the fulcrum-shaft of the elbow-lever $n^4$ is mounted a gear-wheel $n^5$ which meshes with a gear-wheel $n^6$ to the shaft of which is keyed a switch-lever $n^7$ having contact-springs $n^8$ at its end. As soon as the armature $n^2$ is attracted by the electro-magnet $n$, the lever $n^3$ is released, so that the elbow-lever $n^4$ is moved under the tension of its spring against a stop-pin $n^9$, whereby the gear-wheels are rotated and the switch-lever moved in downward direction, so that its contact-springs $n^8$ are moved into contact with two contact-plates $n^{10}$, as shown in Fig. 9, by which the motor-circuit is closed, the motor immediately started and an advertising sign moved into position at the front of the casing by the action of the motion-transmitting sprocket-wheel and chain mechanisms, driving-chains and take-up rollers described. The exhibition of the sign is permitted for a certain length of time, until the second take-up rod, which in the meantime has arrived at the lower end of its guideways, strikes against the inclined arm $n^1$ of the elbow-lever $n^4$ of the starting and stopping mechanism of the motor and moves the same over in the direction of the arrow into the position shown in dotted lines in Fig. 9, whereby the gear-wheels are turned in opposite direction to their former motion so that the fulcrumed latch-lever $n^3$ is moved by its spring $n^x$ into the position shown in dotted lines and into reëngagement with the hook-shaped end of the armature-lever, while the switch-lever with its contact-springs is moved away from the contact-plates of the switch, as shown in dotted lines in Fig. 9 and in full lines in Fig. 4, whereby the current supplied to the motor is interrupted and its motion immediately arrested. During this interruption the motion of the driving-belts is of course interrupted and the sign which is at this time in front of the casing exhibited until the switch on the clock-dial closes again the circuit of the local battery and excites the electromagnet $n$, attracts the armature $n^2$, releases the latch-lever $n^3$ so that the same under the influence of the spring actuates the switch-mechanism and closes the circuit of the motor so as to supply again current to the same and start thereby the motor and the motion-transmitting mechanism of the driving-belts, move by the motion of the latter the take-up rod which is at the lower end of the driving-chain into engagement with the stretching rod of the next sign to be exhibited so that the same is moved upwardly to its full extent, while the sign before exhibited is by the return mechanism moved into intermediate position. It is held in this position until the third sign is moved up, when it is moved over onto the latch-mechanism and returned by the same back along the rear guideways into normal, wound-up position on its spring-roller. The starting and stopping motion of the motor and the motion-transmitting mechanism, and the moving of a sign in position for exhibition and its gradual return to its normal position on the carrier-belts takes place intermittently and automatically and produces thereby the successive exhibition of all the advertising signs in the apparatus.

Having thus described my invention, I claim as new and desire to secure by Letters Patent:

1. In a sign apparatus, the combination of pairs of sprocket-wheels arranged one above the other, carrier-chains traveling on said sprocket-wheels, sign-carrying spring-rollers mounted on said carrier-chains and movable with the latter upwardly at the front of the apparatus and downwardly at the rear, and take-up mechanism for the signs.

2. In a sign apparatus, the combination of carrying elements, spring-rollers mounted on said elements and having advertising signs wound thereon, and means for unrolling and displaying the signs at the front of the apparatus and then moving them, while extended vertically, to the rear of the apparatus.

3. In a sign apparatus, the combination of a casing, movably mounted spring-rollers in said casing having advertising signs wound thereon, means for unrolling and displaying the signs at the front of the apparatus, and means for successively moving each sign so displayed over to the rear part of the casing.

4. In a sign apparatus, the combination of a casing, carrying elements in the lower part of the casing, sign-carrying spring-rollers mounted on said elements and movable therewith upwardly at the front of the casing and downwardly at the rear, and means for taking up the free ends of the signs from the rollers, pulling them in upward direction at the front of the casing, then moving them rearwardly and finally lowering them at the rear of the casing.

5. In a sign apparatus, the combination of a casing, freely movable carrier-chains in the lower part of the casing, sign-carrying spring-rollers carried by said chains, means for unrolling and pulling upwardly each sign at the front of the casing, and means for moving the free end of each extended sign horizontally to the rear, the corresponding spring-roller being also moved in the same direction by the freely movable carrier-chains.

6. In a sign apparatus, the combination of endless carrier-chains, spring-rollers mounted on said chains and having advertising signs wound thereon, means for successively unwinding the signs and pulling them in upward direction at the front of the apparatus, and means for moving the signs while in pulled-up position over to the rear of the apparatus, the means for pulling the signs upwardly being movable downwardly at the rear of the apparatus to permit the gradual winding up of said signs.

7. In a sign apparatus, the combination of endless carrier-chains having sign-carrying spring-rollers mounted thereon, endless driving-chains having take-up devices for the signs which pull the same upwardly at the front of the apparatus, and mechanism by which the upper free ends of the signs are moved over to the rear of the apparatus while the rollers on which said signs are mounted move rearwardly with said carrier-chains.

8. In a sign apparatus, the combination of movably mounted sign-carrying spring-rollers, take-up mechanism for the signs, a motor for operating the take-up mechanism, and a switch for said motor automatically operated by said take-up mechanism.

9. In a sign apparatus, the combination of movably mounted sign-carrying spring-rollers, take-up mechanism for the signs embodying endless chains and take-up devices carried thereby, a motor for driving said chains, a switch in the circuit of said motor, means by which said take-up devices automatically operate said switch to stop the motor, and means for automatically restarting the motor.

10. In a sign apparatus, the combination of a plurality of movably mounted spring-rollers carrying advertising signs, take-up mechanism for said signs embodying endless chains and take-up devices carried thereby, a motor for driving said chains, a switch controlling the operation of said motor, a mechanical connection by which said take-up devices automatically actuate the switch to stop the motor, and means for automatically restarting the motor after the lapse of a certain time.

11. An advertising sign apparatus comprising a plurality of advertising signs, spring-rollers for winding up said signs, stretching rods connected to the outer ends of said signs, endless carrier-chains for the spring-rollers, take-up mechanism for intermittently engaging one stretching rod after the other for successively exhibiting the signs, means for returning the stretching rods at the rear of the carrier-chains so as to permit the winding up of the signs on the spring-rollers, and an intermittently actuated driving mechanism for imparting intermittent motion to the take-up mechanism.

12. A sign apparatus consisting of endless carrier-chains, spring-rollers supported equidistantly on said carrier-chains, advertising signs wound on said spring-rollers, stretching rods at the outer ends of said advertising signs, mechanism for engaging intermittently and successively the stretching rods so as to extend the signs to their full length, and a return mechanism for returning the stretching rods and signs at the rear of the carrier-chains.

13. In an advertising sign apparatus, the combination of intermittently actuated driving-chains, take-up devices on said driving-chains, endless carrier-chains, spring-rollers on said carrier-chains, advertising signs wound up on said spring-rollers, stretching rods at the outer ends of said signs, a lever mechanism operated by one of said take-up devices for moving one stretching rod after the other into the path of the other take-up device, a return mechanism for the stretching rods, and means for imparting intermittent motion to the driving-chains for taking up one stretching rod after the other for successively unwinding and exhibiting the signs.

14. In an advertising sign apparatus, the combination, with the driving-chains, of take-up devices carried by the same, endless carrier-chains provided with spring-rollers, advertising signs wound up on said spring-rollers, stretching rods at the outer ends of said signs, said stretching rods being intermittently and successively engaged by the take-up devices, and return mechanism for said stretching rods comprising a toothed disk, a spring-actuated latch alongside of the same, a push-lever for turning the disk and a latch mechanism for intermittently returning the stretching rods into the path of the take-up devices.

In testimony, that I claim the foregoing as my invention, I have signed my name in presence of two subscribing witnesses.

CHARLES BEILE.

Witnesses:
PAUL GOEPEL,
HENRY J. SUHRBIER.